United States Patent [19]
Dixon et al.

[11] 3,918,270
[45] Nov. 11, 1975

[54] AUTOMOBILE AIR CONDITIONING SYSTEM

[76] Inventors: Don P. Dixon; John T. Bertva, both of P.O. Box 18327, Serna Station, San Antonio, Tex. 78286

[22] Filed: July 15, 1974

[21] Appl. No.: 488,800

[52] U.S. Cl. .................. 62/239; 62/243; 62/244
[51] Int. Cl.² ........................................ B60H 3/04
[58] Field of Search ............ 62/243, 244, 239, 241, 62/61

[56] References Cited
UNITED STATES PATENTS

| | | | |
|---|---|---|---|
| 2,718,763 | 9/1955 | Burgess | 62/243 |
| 3,411,316 | 11/1968 | Wright | 62/241 |
| 3,606,762 | 9/1971 | Anglin | 62/244 |

*Primary Examiner*—William J. Wye
*Attorney, Agent, or Firm*—W. F. Hyer; Marvin B. Eickenroht

[57] ABSTRACT

An air conditioning system for a Dasher or Audi-Fox automobile wherein a condenser coil is mounted on the front face of the radiator.

4 Claims, 5 Drawing Figures

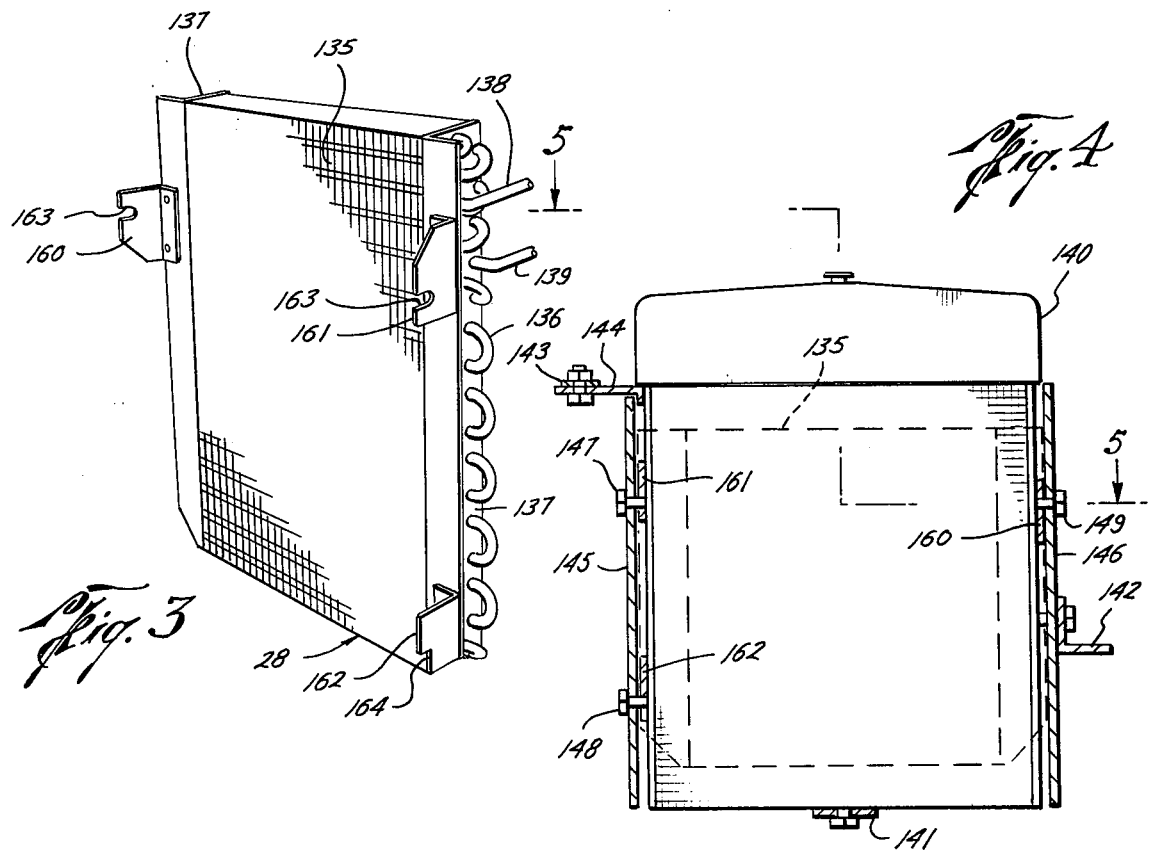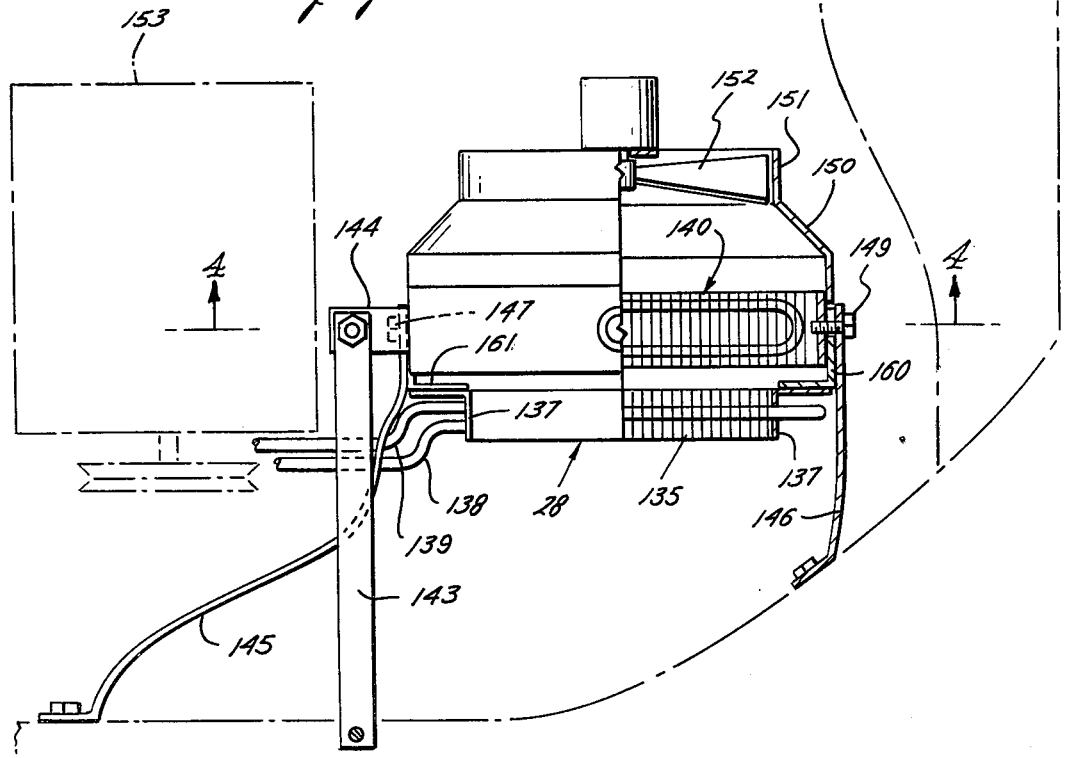

AUTOMOBILE AIR CONDITIONING SYSTEM

This invention relates generally to an air conditioning system for a 1973–74 Audi-Fox or a 1974 Dasher automobile. Space for non-factory installed equipment, and especially the components of an air conditioning system, is at a premium in automobiles of this type. Therefore, difficulties are encountered in installing such components without considerable alteration of existing parts of the automobile and/or use of extensive mounting parts, all of which add to the cost of installation.

An object of this invention is to provide a system in which the condenser of such a system is mounted in an area which is not ordinarily required for normal use of the automobile.

Another object is to provide an air conditioning system having a condenser which is mounted in such a way that it does not require additional parts for circulating fresh air therethrough, it requires a minimum alteration of other existing parts, it requires no additional parts for its installation, and it requires only simple modifications of a standard coil.

In the drawings, wherein like reference characters are used throughout to designate like parts:

FIG. 3 is a perspective view of a condenser constructed in accordance with the present invention, and as seen from the back and right side thereof;

FIG. 4 is a vertical cross-sectional view of the condenser, as seen along broken lines 4—4 of FIG. 5, mounted on the front side of the radiator of the automobile; and FIG. 5 is a view from the top, and partly in section, as seen along broken line 5—5 of FIG. 4, of the mounted condenser, radiator and plenum extending between the front grill of the automobile and the radiator.

Figure 1:
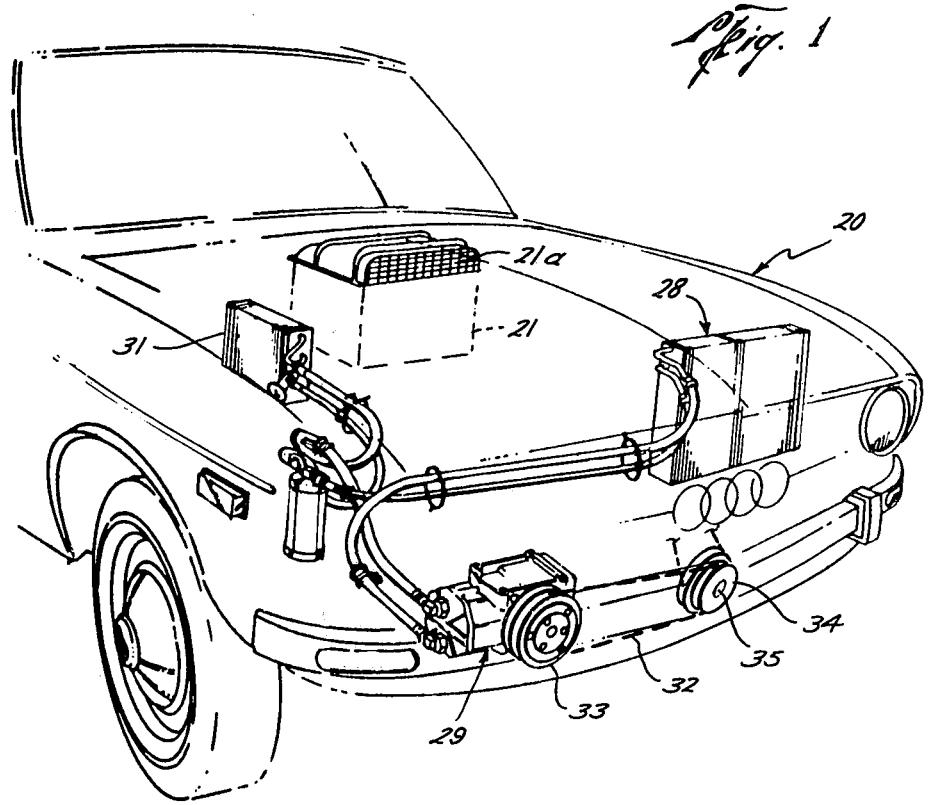
FIG. 1 is a perspective view of the front end of a 1973–74 Audi-Fox or 1974 Dasher automobile, shown in phantom and with the components of an air conditioning system constructed in accordance with the present invention shown in solid lines in approximately the positions they occupy when installed therein.
Figure 2:
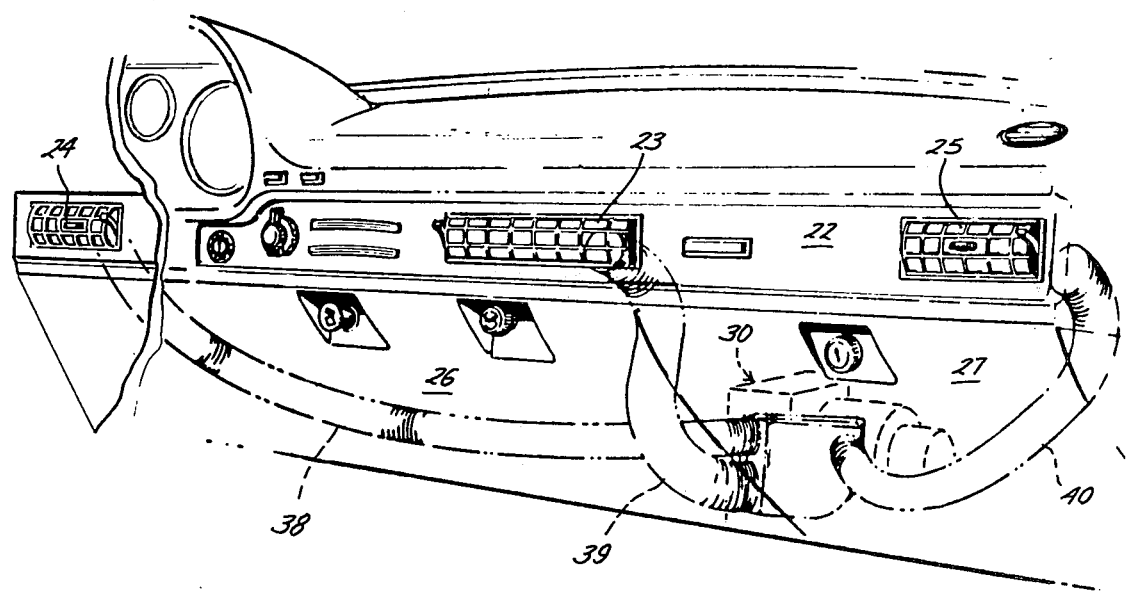
FIG. 2 is a perspective view of the front of the passenger compartment of the automobile, showing in broken lines the evaporator assembly of the air conditioning system and the hoses which connect it to existing ducts in the dash.

With reference now to the details of the abovedescribed drawings, the 1973–74 Audi-Fox or 1974 Dasher automobile shown in FIG. 1, and designated in its entirety by reference character 20, has its engine mounted beneath a hood in the front, and a radiator mounted on its left side (with respect to the forward direction of movement of the automobile) behind a ventilated grill across the front end of the engine. Air is admitted to a housing 21 within the passenger compartment through an inlet 21a beneath the hood but above a horizontal bottom wall of the dash, which, as best shown at 22 in FIG. 2, extends laterally across the front of the passenger compartment. As also shown in FIG. 2, there is a center panel 26 beneath the dash, and a glove compartment 27 beneath the dash intermediate the center panel 26 and the right side wall of the automobile. The glove compartment is hingedly mounted in such a way that it may be moved from the closed position of FIG. 2 to an open position to permit access to its interior.

The components of the air conditioning system include a condenser 28 mounted, in a manner to be described, on the front face of the radiator of the automobile, a compresser 29 mounted on the right side of the engine block of the automobile, and an evaporator assembly 30 including a housing containing a coil 31 mounted entirely within the passenger compartment between the housing 21 and the right side wall of the automobile behind the glove compartment 27. As indicated in FIG. 1, and as well known in the art, these as well as other components of the air conditioning system are fluidly connected by hoses to permit a regrigerant to be circulated therethrough, so that cooled air from the evaporator may be circulated into the passenger compartment through ducts 23, 24 and 25 in the dash. As shown in FIG. 1, the compresser 29 is operated by a pulley 32 connecting a sheave 33 on its front side with a sheave 34 driven by crank shaft 35 of the automobile.

As shown in FIGS. 3 to 5, the condenser 28 includes a coil 135 having tubes 136 extending laterally through fins and mounted by means of plates 137 along their sides. Conduits 138 and 139 extend through the plate on one side of the coil for circulating refrigerant therethrough. As previously described, and in accordance with the present invention, the condenser coil is mounted on the front face of the radiator 140, which, in this automobile, is located on the left side of the engine compartment, rearwardly of the open grill through which air circulates. The radiator is mounted by suitable means, such as a bottom bracket 141 and a side bracket 142, both connected to the frame of the automobile. In addition, the radiator is braced by means of an arm 143 connecting a flange 144 on the radiator with a portion of the grill.

A portion of the air circulating through the grill is confined to passage through the radiator by means of a plenum which includes side panels 145 and 146. As shown in FIGS. 4 and 5, side panel 145 is connected to the right side of the radiator (looking forwardly from the automobile) by means which includes an upper bolt 147 and a lower bolt 148, and side panel is connected to the left side of the radiator by means which includes a bolt 149 which is on generally the same vertical level as the bolt 147.

As shown in FIG. 5, a plenum 150 extends from the back side of the radiator to a ring 151 surrounding a fan 152 which induces air flow through the radiator. Looking down into the engine compartment of the automobile, as in FIG. 5, the alternator 153 is disposed just to the left of the radiator and arm 143 for bracing it.

With the condenser 28 mounted on the front side of the radiator, as will be described, the coil is positioned to receive sufficient air flow thereacross without the additional air circulating equipment. In order to compensate for reduced air flow to the radiator, additional air flow through the grill and into the engine compartment is obtained by opening one or more panels across it. More particularly, the condenser is mounted on the radiator without alteration of the radiator, and by means of existing parts used to connect the side panels of the plenum to the sides of the radiator.

Thus, as shown, upper flanges 160 and 161 are connected to outwardly extending flange on the opposite side walls 137 of the coil, and a lower flange 162 is connected to the flange on the left side wall beneath and vertically aligned with the flange 161. Each of the flanges 160 and 161 is identical, although they are reversed top for bottom for connection to the coil 135 so as to dispose rearwardly opening slots 163 therein on generally the same vertical level. The lower rear corner of flange 162 is cut out at 164 so that its edges provide downwardly and rearwardly facing shoulders.

As illustrated in FIGS. 4 and 5, the flanges 160, 161 and 162 are connected between the sides of the radiators and the plenum side walls connected thereto. Thus, the bolts connecting the plenum side walls are loosened to permit the inner sides to be spaced from the adjacent sides of the radiators, whereby flanges may be fitted between them — i.e., the flanges 161 and 162 fit between the right side of the radiator and the right plenum panel, and the flange 160 fits between the left side of the radiator and the left plenum panel — with the bolts 147 and 149 moving within slots 163 and bolt 148 moving into cut out 164. The bolts may then be tightened to hold the condenser in place, with its upper edge just beneath the header on the upper end of the radiator 140, and its lower edge above the fastening bracket 141. As cut out portion 164 moves over bolt 148, its horizontal shoulder will rest on the top thereof and its vertical shoulder on the front side thereof, thereby providing support for the condenser and spacing its lower end from the radiator.

As will be appreciated from FIG. 5, the right hand plenum panel 145 may be cut out in any suitable way to permit hoses to extend from the conduits 138 and 139 across the front end of the engine compartment, as shown in FIG. 1. Also, one end of the arm 143 may be released to permit it to be swung out of position during installation of the coil and hoses.

From the foregoing it will be seen that this invention is well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an automobile having a radiator disposed rearwardly of a ventilated grill at the front end of the automobile, and a plenum which extends between the grill and front face of the radiator and has side panels which are connected by bolts to the sides of the radiator; an air conditioning system including a condenser coil, and means including at least certain of said bolts mounting the coil on the front face of the radiator.

2. An air conditioning system of the character defined in claim 1, including suction and discharge hoses extending from and to the coil through one of the plenum side panels.

3. An air conditioning system of the character defined in claim 1, wherein said mounting means includes a flange which extends from the rear face of the coil at each side thereof and fits between a side of the radiator and a side panel of the plenum, each flange having an opening through which one of the bolts extends.

4. An air conditioning system of the character defined in claim 3, wherein said mounting means also includes another flange which extends from the rear face of the coil beneath one of the first-mentioned flanges and fits between a side of the radiator and a side panel of the plenum, said other flange having downwardly and rearwardly facing shoulders engaging another of said bolts.

* * * * *